US009210533B1

(12) United States Patent
Monga et al.

(10) Patent No.: US 9,210,533 B1
(45) Date of Patent: Dec. 8, 2015

(54) RESOURCE BLOCK STRUCTURE AND CONTROL IN A WIRELESS OFDM COMMUNICATION SYSTEM

(71) Applicant: Sprint Communications Company L.P., Overland Park, KS (US)

(72) Inventors: Manoj Monga, Olathe, KS (US); Saravana Velusamy, Olathe, KS (US); Suryanarayanan Ramamurthy, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 124 days.

(21) Appl. No.: 14/081,859

(22) Filed: Nov. 15, 2013

(51) Int. Cl.
*H04W 4/00* (2009.01)
(52) U.S. Cl.
CPC ..................... *H04W 4/005* (2013.01)
(58) Field of Classification Search
CPC .................................................. H04W 4/005
See application file for complete search history.

(56) References Cited

U.S. PATENT DOCUMENTS

| | | | |
|---|---|---|---|
| 8,179,849 B2 | 5/2012 | Callard et al. | |
| 2010/0128614 A1* | 5/2010 | Kuusela et al. | 370/252 |
| 2011/0275379 A1* | 11/2011 | Hakola et al. | 455/450 |
| 2012/0327896 A1 | 12/2012 | Lee et al. | |
| 2013/0142118 A1* | 6/2013 | Cherian et al. | 370/328 |

FOREIGN PATENT DOCUMENTS

| | | |
|---|---|---|
| EP | 2241019 | 7/2009 |
| WO | 2009088911 | 7/2009 |
| WO | 2013009346 | 1/2013 |

* cited by examiner

*Primary Examiner* — Mohammad Anwar

(57) ABSTRACT

A wireless base station schedules allocated resource blocks from an OFDM resource block structure to a UEs and holds unallocated resource blocks from the OFDM resource block structure for machines. The base station decodes wireless OFDM signals based on the OFDM resource block structure to obtain user data from the UEs using the allocated resource blocks and to obtain machine data from the machine devices using the unallocated resource blocks. The base station processes the machine data from the unallocated resource blocks to validate authorization marks in individual resource blocks. The base station transfers portions of the machine data having the valid authorization marks for delivery. The base station inhibits the transfer of machine data not having the valid authorization marks.

20 Claims, 6 Drawing Sheets

US 9,210,533 B1

RESOURCE BLOCK STRUCTURE AND CONTROL IN A WIRELESS OFDM COMMUNICATION SYSTEM

TECHNICAL BACKGROUND

Wireless communication devices exchange data with wireless communication networks. Some of these wireless networks use Orthogonal Frequency Division Multiplex (OFDM) technology, such as Long Term Evolution (LTE). Wireless communications using OFDM is based on resource blocks. The resource blocks are each a unique combination of time and frequency.

The wireless transfer of machine data from machine-to-machine (without humans) is growing rapidly. In OFDM systems, machines request communication service from the wireless network, and the network schedules resource blocks for the individual machines. The wireless network then instructs the machines of their resource block schedule, and the machines transmit and receive based on the resource block instructions from the wireless network.

TECHNICAL OVERVIEW

A wireless base station schedules allocated resource blocks from an OFDM resource block structure to UEs and holds unallocated resource blocks from the OFDM resource block structure for machines. The base station decodes wireless OFDM signals based on the OFDM resource block structure to obtain user data from the UEs using the allocated resource blocks and to obtain machine data from the machine devices using the unallocated resource blocks. The base station processes the machine data from the unallocated resource blocks to validate authorization marks in individual resource blocks. The base station transfers portions of the machine data having the valid authorization marks for delivery. The base station inhibits the transfer of machine data not having the valid authorization marks.

DETAILED DESCRIPTION

Figure 1:
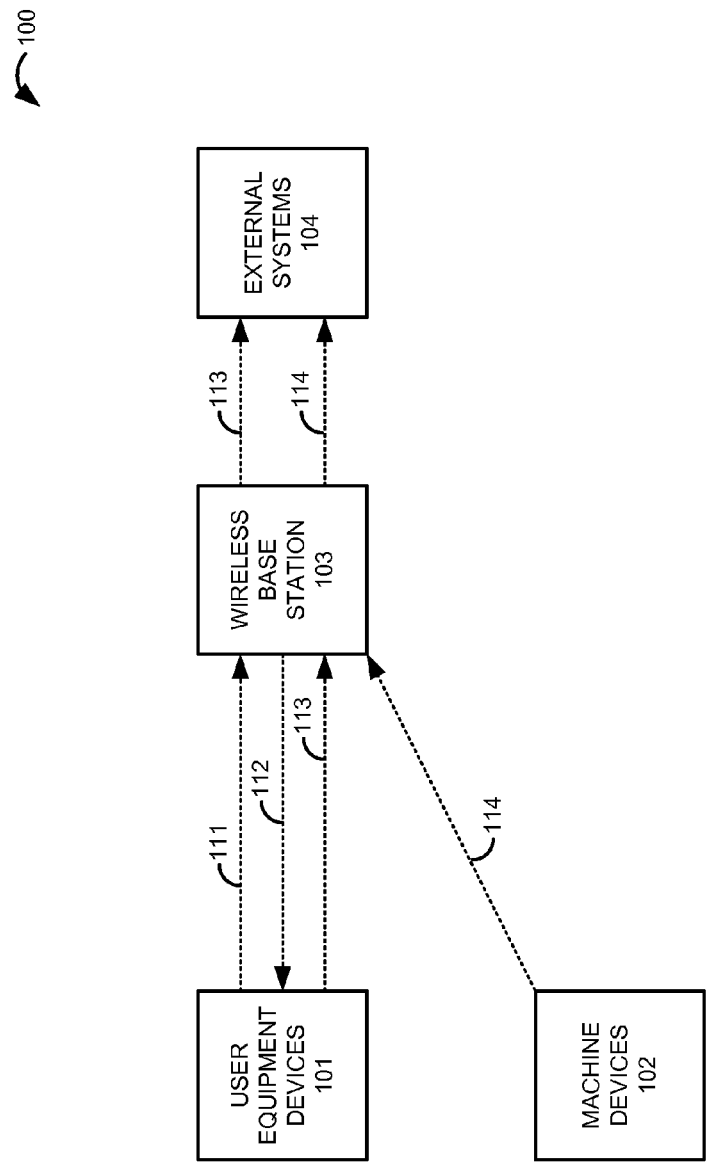
FIG. 1 illustrates a communication system to handle user data and machine data using an OFDM resource block structure.

FIG. 1 illustrates communication system 100 to handle user data 113 and machine data 114 using an Orthogonal Frequency Division Multiplex (OFDM) resource block structure. Communication system 100 includes User Equipment devices (UEs) 101, machine devices 102 and wireless base station 103. UEs 101 might be a computers, phones, media players, wireless transceivers, or some other user apparatus having a user interface and communication components. Machines 102 might be computers, appliances, vehicles, industrial equipment, or some other apparatus having data communication components. External systems 104 might be gateways, servers, routers, network elements, user communication devices, and the like.

Although UEs 101 and machines 102 are both "machines" in a technical sense, they are distinguished by their respective communications being primarily human-initiated or machine-initiated. Wireless base station 103 uses an Orthogonal Frequency Division Multiplex (OFDM) resource block structure. Wireless base station 103 could be a Long Term Evolution (LTE) eNodeB, Wireless Microwave Access (WiMAX) access point, or some other computerized wireless OFDM communication platform.

In operation, wireless base station 103 receives individual communication requests 111 from UEs 101. In response, wireless base station 103 schedules some resource blocks from the OFDM resource block structure for UEs 101. Wireless base station 103 transfers individual communication grants 112 to UEs 101 indicating their allocated resource blocks.

Wireless base station 103 holds other resource blocks from the OFDM resource block structure for machine devices 102. The resource blocks that are scheduled for UEs 101 are referred to as "allocated" resource blocks while the resource blocks that are held for machines 102 are referred to as "unallocated" resource blocks. The allocated resource blocks each have one or more UEs 101 scheduled for transmission using the resource block. The unallocated resource blocks are not scheduled for individual machines 102, but instead, are automatically used by individual machines 102 without being scheduled.

UEs 101 transfer user data 113 to wireless base station 103 in wireless OFDM signals based on the communication grants. Machines 102 transfer machine data 113 to wireless base station 103 in wireless OFDM signals based on their internal logic and the OFDM resource block structure. To use the OFDM resource block structure, an individual one of machines 102 processes internal logic to translate data, such as a stored identifier and/or the current time to select and use one or more unallocated resource blocks. The machine also processes internal logic to insert valid authorization marks into the unallocated resource blocks that it uses. The current time could have fine or grainy resolution (like nano-second versus date). The identifier could be an Electronic Serial Number (ESN), International Mobile Equipment Identifier (IMEI), International Mobile Subscriber Identifier (IMSI), Media Access Control Identifier (MAC ID), account number, or some other tracking code. In some examples, an authorization mark comprises a special byte embedded within in a Dynamic Stream Control Protocol (DSCP) mark.

Note that the selection and use of the unallocated resource blocks may be triggered by processing identifiers and/or time to determine a transmission schedule. The radio frequencies and wireless protocols for these data communications may be pre-stored in machines 102 or dynamically selected based on internal logic. Note that one or more remote servers may also process similar logic to identify when and how individual machines 102 will transmit machine data 114. In some examples, machines 102 may individually monitor unallocated resource blocks for interference, and if the interference is below a threshold, then they transmit their machine data 114 along with the valid authorization marks.

Wireless base station 103 decodes the wireless OFDM signals based on the OFDM resource block structure to obtain user data 113 from UEs 101 using the allocated resource blocks. Wireless base station 103 also decodes the wireless OFDM signals based on the OFDM resource block structure to obtain machine data 114 from machines 102 using the unallocated resource blocks. Wireless base station 103 transfers user data 113 for subsequent delivery by external systems 104.

Wireless base station 103 processes machine data 114 from the unallocated resource blocks to validate authorization marks in the individual resource blocks. Wireless base station 103 transfers the portions of machine data 114 that have valid authorization marks for subsequent delivery or consumption by external systems 104. Wireless base station 103 inhibits the transfer of other portions of machine data 114 that do not have valid authorization marks.

In some examples, wireless base station 103 processes data from the allocated resource blocks to identify invalid authorization marks in the allocated resource blocks (perhaps invalid simply because the resource blocks are allocated). In response to the invalid authorization marks, wireless base station 103 inhibits the transfer of data from these resource blocks.

In some examples, wireless base station 103 aggregates machine data 114 data from the unallocated resource blocks, and may also sort aggregated data 114 by time, identifier, and/or authorization mark. Wireless base station 103 then transfers the aggregated/sorted portions of machine data 114 for delivery by external systems 104 to a remote data server. In Long Term Evolution (LTE) systems, wireless base station 103 may transfer aggregated portions of machine data 114 to a remote data server without transit through Service Gateways (S-GWs) or Packet Gateways (P-GWs).

The above examples discuss wireless transmission from machines 102 to wireless base station 103. The same technique applies to wireless data transmission from wireless base station 103 to machines 102. Thus, machines 102 would receive machine data over unallocated resource blocks based on the resource block structure and using their internal logic. The various features and options discussed above could be implemented on these receive links as well.

Figure 2:
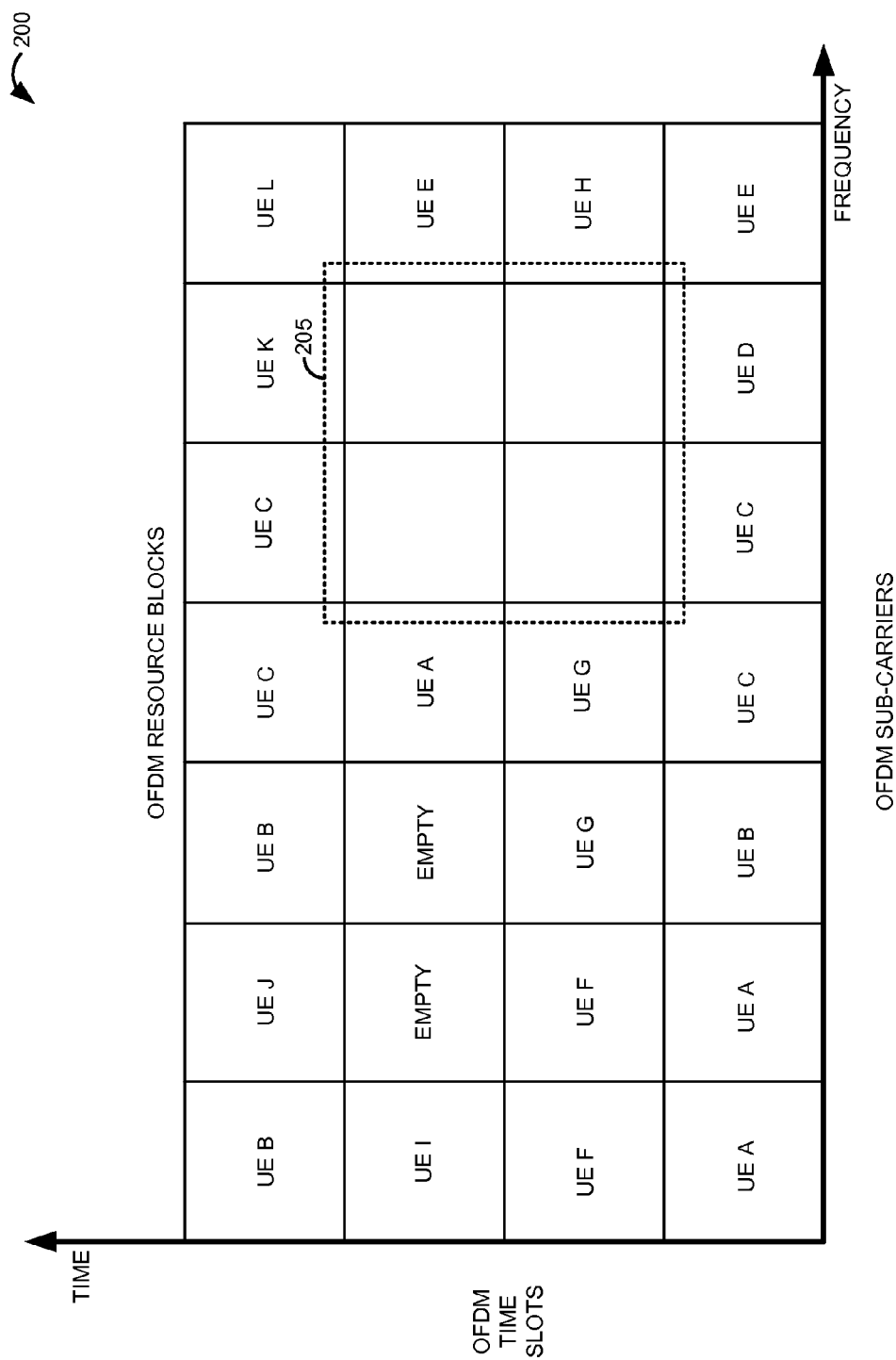
FIG. 2 illustrates an OFDM resource block structure to handle user data and machine data.

FIG. 2 illustrates OFDM resource block structure 200 to handle user data and machine data. OFDM resource block structure 200 is an example of the structure used by wireless base station 103, although base station 103 could use other configurations. The vertical axis represents time as measured by OFDM time slots. The horizontal axis represents frequency as measured by OFDM subcarriers.

Several of the OFDM resource blocks are allocated and scheduled for UEs A-L. A few of these allocated resource blocks are still empty and have not been scheduled. OFDM resource blocks 205 are unallocated and held for automatic use by machine devices. The wireless base station will decode wireless OFDM signals based on OFDM resource block structure 200 to obtain user data from UEs A-L using the allocated resource blocks. The wireless base station will decode wireless OFDM signals based on OFDM resource block structure 200 to obtain machine data from machine devices automatically using unallocated resource blocks 205.

The machine devices translate data, such as a stored identifier and/or the current time to select and use unallocated resource blocks 205. For example, a machine device may access a look-up table with its IMEI to yield transmit date, frequency, and resource block(s). In some cases, a hash using a current time could also be used to randomize this selection of unallocated resource blocks. In another example, a machine device may access a look-up table with a current time to yield transmit date, frequency, and resource block(s). In these cases, a hash using a current time or identifier could be used to randomize this selection of unallocated resource blocks. In addition to randomization, both time and identifier could be used to sequence transmissions—even within a particular user group of identifiers.

Figure 3:
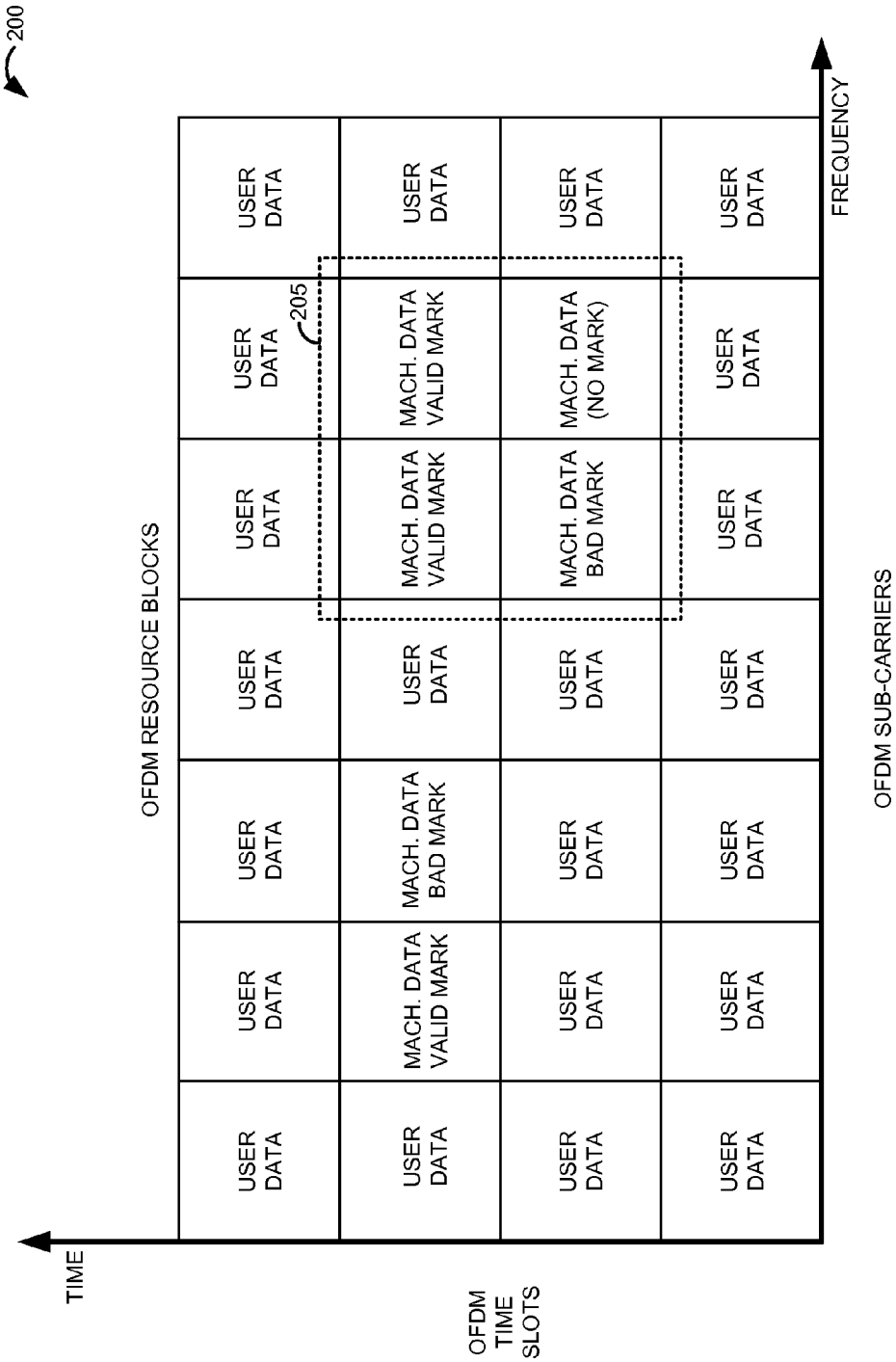
FIG. 3 illustrates an OFDM resource block structure to handle user data and machine data.

FIG. 3 illustrates another view of OFDM resource block structure 200 to handle user data and machine data. The user data from UEs A-L using the allocated resource blocks is shown. The machine devices have inserted authorization marks into the machine data transmitted using the unallocated resource blocks 205. The wireless base station validates the authorization marks in the individual resource blocks. The validation is accomplished by comparing the marks to known valid marks or by using mark analysis logic. In this example, the machine data from the two resource blocks having the valid authorization marks is forwarded on, but the machine data from the two resource blocks having the bad authorization mark and no authorization mark is inhibited and possibly discarded.

In some examples, the wireless base station processes data from the allocated resource blocks to identify invalid authorization marks. Thus, the wireless base station would identify data in an allocated resource block, and could inhibit the data based on the authorization marks—whether valid or not.

In some examples, the wireless base station aggregates machine data from unallocated resource blocks 205. The wireless base station may also sort the aggregated data by time, identifier, and/or authorization mark. The wireless base station then transfers the aggregated/sorted portions of machine data for delivery to a remote data server.

Figure 4:
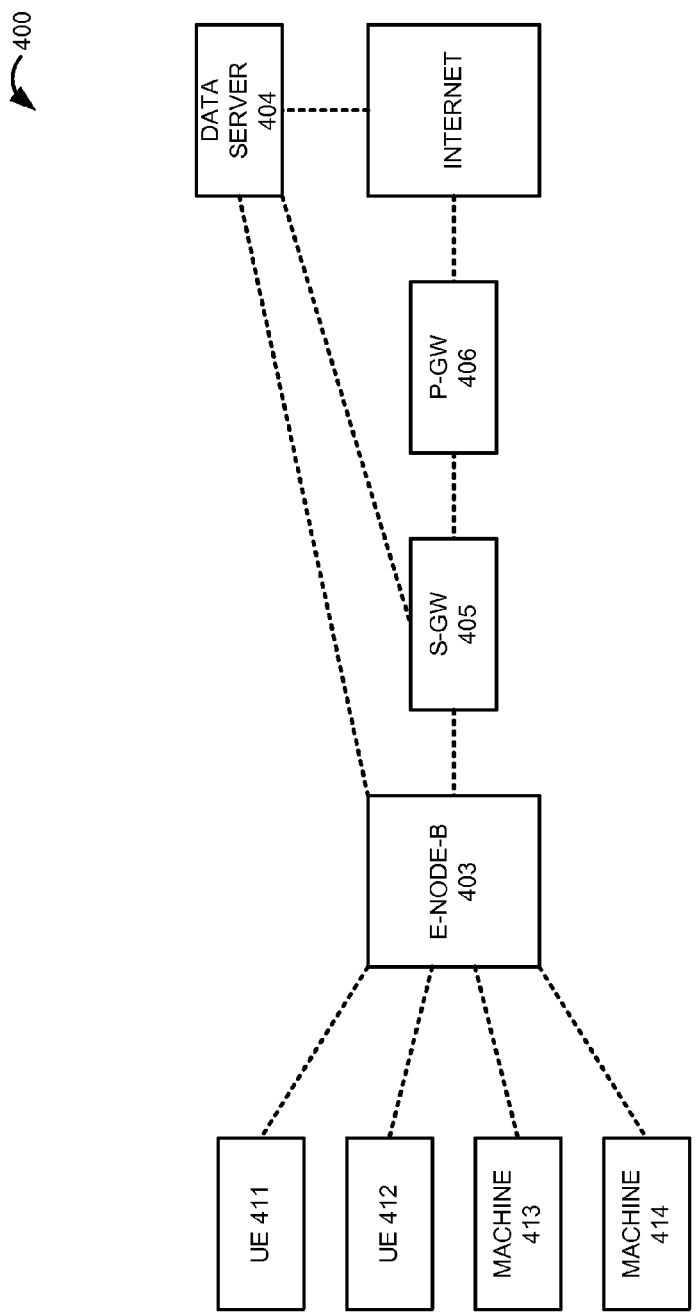
FIG. 4 illustrates an LTE network to handle user data and machine data using an LTE resource block structure.

FIG. 4 illustrates LTE network 400 to handle user data and machine data using an LTE resource block structure. LTE network 400 includes eNodeB 403, data server 404, S-GW 405, P-GW 406, UEs 411-412, and machine devices 413-414. UEs 411-412 might be computers, phones, media players, wireless transceivers, or some other user apparatus having a user interface and communication components. Machine devices 413-414 might be computers, appliances, vehicles, industrial equipment, or some other apparatus having data communication components.

In operation, eNodeB 403 receives individual communication requests from UEs 411-412. In response, eNodeB 403 schedules some resource blocks from its resource block structure for UEs 411-412. ENodeB 403 transfers individual LTE communication grants to UEs 411-412 indicating their allocated resource blocks. eNodeB 403 holds other resource blocks from its resource block structure for machine devices 413-414. The unallocated resource blocks are not scheduled for individual machines 413-414, but are automatically used by machines 413-414 without being scheduled.

UEs 411-412 transfer their user data to eNodeB 403 based on the LTE communication grants. Machines devices 413-414 transfer machine data to eNodeB 403 based on internal logic and the LTE resource block structure. Machine devices 413-414 also process their internal logic to insert valid authorization marks into the unallocated resource blocks that they use. In some examples, an authorization mark comprises a special byte embedded within a Dynamic Stream Control Protocol (DSCP) mark.

Note that the selection and use of the unallocated resource blocks may also be triggered by processing identifiers and/or time to determine a transmission schedule. The radio frequencies and wireless protocols for these data communications may be pre-stored in machines 413-414 or dynamically selected based on internal logic. Note that data server 404 may process similar logic to identify when and how machine devices 413-414 will transmit machine data. In some examples, machine devices 413-414 individually monitor the unallocated resource blocks to avoid collisions with one another. If an unallocated resource block is being used, then another unallocated resource block is tried.

eNodeB 403 decodes the wireless LTE signals based on the LTE resource block structure to obtain user data from UEs 411-412 using the allocated resource blocks. eNodeB 403 also decodes the wireless LTE signals based on the LTE resource block structure to obtain machine data from machine devices 413-414 using the unallocated resource blocks. eNodeB 403 transfers the user data for subsequent delivery by S-GW 405 and/or P-GW 406.

eNodeB 403 processes the machine data from the unallocated resource blocks to validate authorization marks in the individual resource blocks. eNodeB 403 transfers the portions of the machine data with valid authorization marks for delivery to data server 404. eNodeB 403 inhibits the transfer of any machine data that does not have valid authorization marks.

eNodeB 403 aggregates the machine data from the unallocated resource blocks. As desired, eNodeB 403 sorts the aggregated machine data by time, identifier, and/or authorization mark. eNodeB 403 then transfers the aggregated/sorted machine data directly to remote data server 404 without using S-GW 405 and without using P-GW 406.

The above examples discuss reverse LTE transmission from machines 413-414 to eNodeB 403. The same technique applies to forward LTE transmission from eNodeB 403 to machine devices 413-414. Thus, machines 413-414 could receive machine data over unallocated resource blocks based on the LTE resource block structure and their internal logic. The various features and options discussed above could be implement on these forward links as well.

Figure 5:
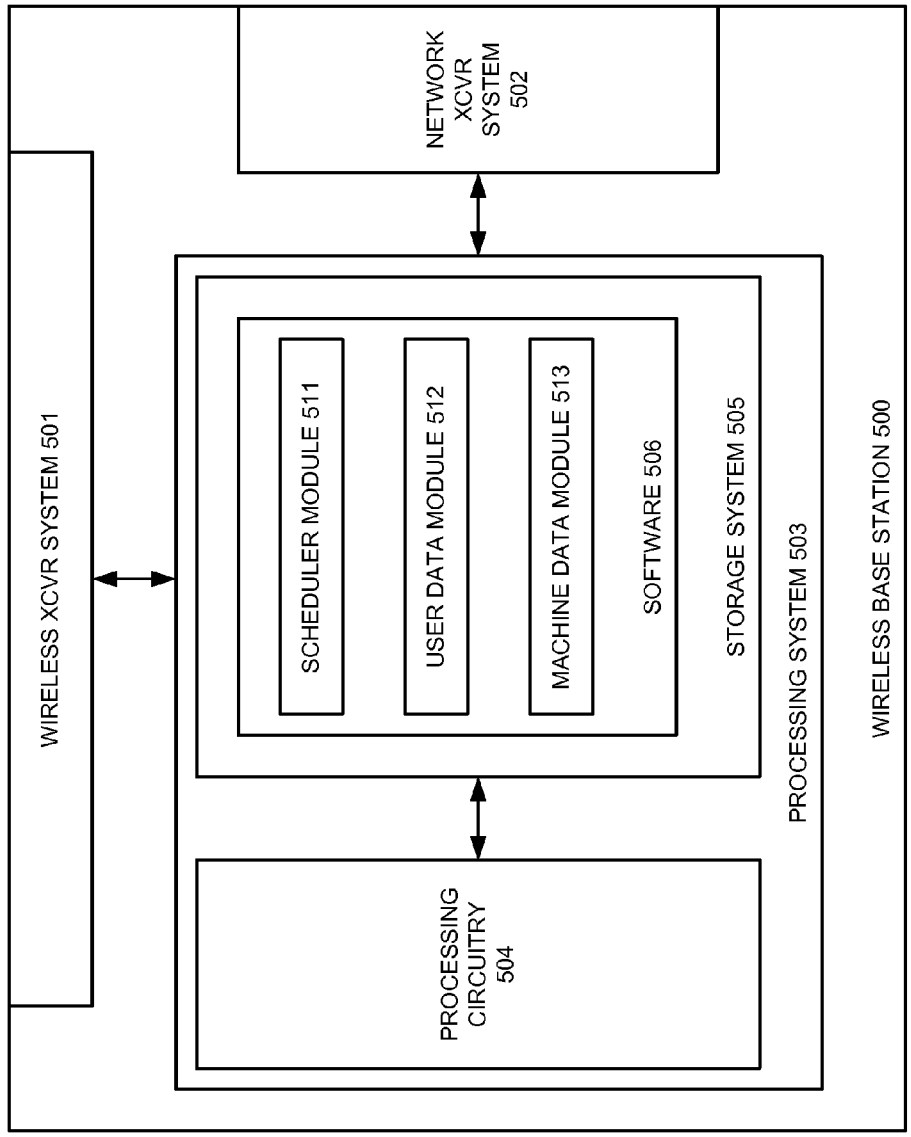
FIG. 5 illustrates a wireless base station to handle user data and machine data using an OFDM resource block structure.

FIG. 5 illustrates wireless base station 500 to handle user data and machine data using an OFDM resource block structure. Wireless base station 500 is an example of wireless base station 103 and eNodeB 403, although these communication systems may use alternative configurations and operations. Wireless base station 500 comprises wireless transceiver system 501, network transceiver system 502, and processing system 503. Processing system 503 comprises processing circuitry 504 and storage system 505. Storage system 505 stores software 506. Wireless base station 500 may be integrated within other systems and may be distributed across multiple diverse computer and communication systems. Some conventional aspects of base station 500 are omitted for clarity, such as power supplies, enclosures, and the like.

Wireless transceiver system 501 comprises communication components, such as antennas, filters, amplifiers, signal processing circuitry, memory, software, and the like. Wireless transceiver system 501 receives and/or transmits machine data in unallocated OFDM resource blocks as described herein.

Network transceiver system 502 comprises communication components, such as data ports, signal processing circuitry, memory, software, and the like. Network transceiver system 503 receives and/or transmits machine data to/from external systems as described herein. In some cases, network transceiver system 502 transfers aggregated machine data over alternative backhaul links to off-load downstream gateways.

Processing circuitry 504 comprises circuit boards that hold integrated circuitry and associated electronics. Storage system 505 comprises non-transitory, machine-readable, data storage media, such as flash drives, disc drives, servers, memory circuitry, and the like. Software 506 comprises machine-readable instructions that control the operation of processing circuitry 504 when executed. Software 506 includes modules 511-513 and may also include operating systems, applications, utilities, databases, and the like. All or portions of software 506 may be externally stored on one or more storage media, such as flash drives, discs, servers, and the like.

When executed by processing circuitry 504, scheduler module 511 directs circuitry 504 to schedule allocated resource blocks and to hold unallocated resource blocks according to an OFDM resource block structure as described herein. When executed by processing circuitry 504, user data module 512 directs circuitry 504 to receive and/or transmit user data using the schedule and resource block structure as described herein. When executed by processing circuitry 904, machine data module 513 directs circuitry 504 to receive and/or transmit machine data using the unallocated portion of the resource block structure and authorization marks as described herein.

Figure 6:
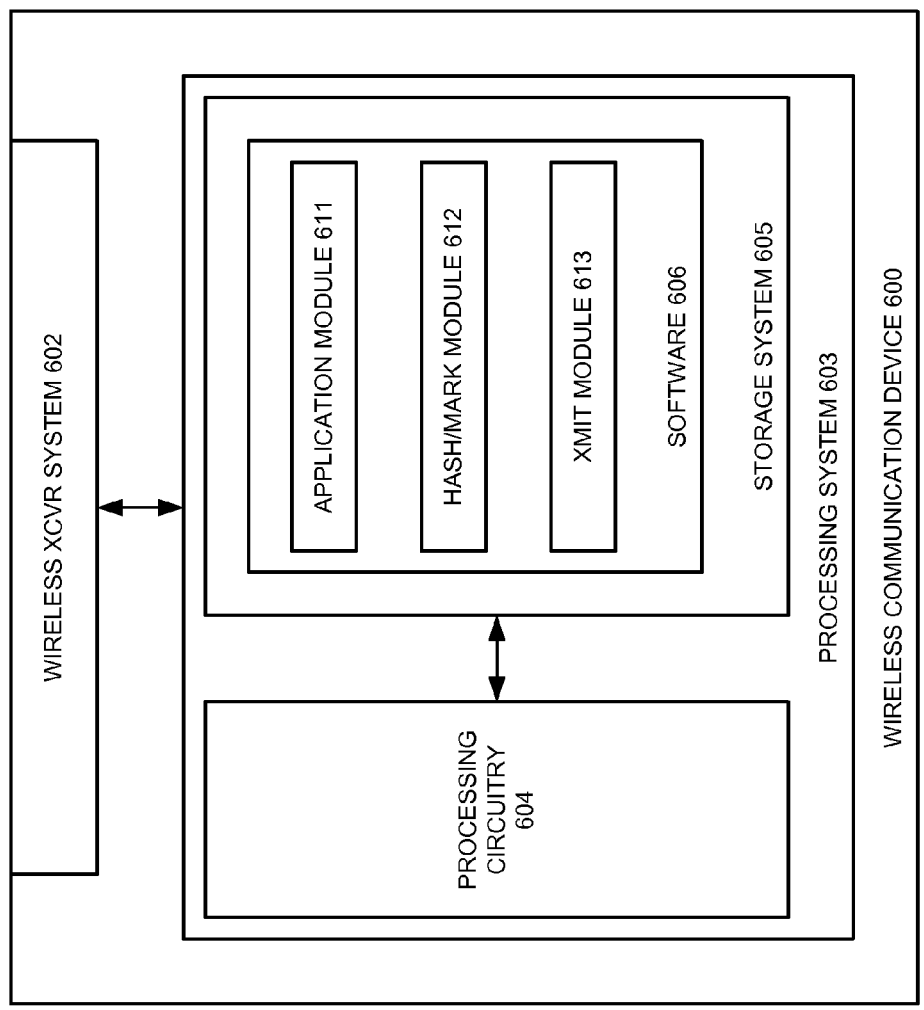
FIG. 6 illustrates a wireless communication device to handle user data and machine data using an OFDM resource block structure.

FIG. 6 illustrates wireless communication device 600 to handle user data and machine data using an OFDM resource block structure. Wireless communication device 600 is an example of the machine devices 102 and 413-414, although these devices may use alternative configurations. Wireless communication device 600 comprises wireless transceiver system 602 and processing system 603. Processing system 603 comprises processing circuitry 604 and storage system 605. Storage system 605 stores software 606. Wireless communication device 600 may be integrated within other systems and may be distributed across multiple diverse computer and communication systems. Some conventional aspects of wireless communication device 600 are omitted for clarity, such as power supplies, enclosures, and the like.

Wireless transceiver system 602 comprises communication components, such as antennas, filters, amplifiers, signal processing circuitry, memory, software, and the like. Wireless transceiver system 602 receives and/or transmits machine data in unallocated OFDM resource blocks as described herein.

Processing circuitry 604 comprises circuit boards that hold integrated circuitry and associated electronics. Storage system 605 comprises non-transitory, machine-readable, data storage media, such as flash drives, disc drives, memory circuitry, and the like. Software 606 comprises machine-readable instructions that control the operation of processing circuitry 604 when executed. Software 606 includes modules 611-613 and may also include operating systems, applications, utilities, databases, and the like. All or portions of software 606 may be externally stored on one or more storage media, such as flash drives, discs, servers, and the like.

When executed by processing circuitry 604, application module 611 directs circuitry 604 to transmit and/or receive machine data. When executed by processing circuitry 604, hash/mark module 612 directs circuitry 604 to select unallocated resource blocks and to identify valid authorization marks as described herein. When executed by processing circuitry 604, transmit module 613 directs circuitry 604 to transmit machine data using unallocated resource blocks and valid authorization marks as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system that uses an Orthogonal Frequency Division Multiplex (OFDM) resource block structure, the method comprising:
in a wireless base station, scheduling allocated resource blocks from the OFDM resource block structure to a plurality of User Equipment devices (UEs) and holding unallocated resource blocks from the OFDM resource block structure for a plurality of machine devices;
in the wireless base station, decoding wireless OFDM signals based on the OFDM resource block structure to obtain user data from the UEs using the allocated resource blocks and to obtain machine data from the machine devices using the unallocated resource blocks, and transferring the user data for subsequent delivery; and
in the wireless base station, processing the machine data from the unallocated resource blocks to validate authorization marks in individual ones of the unallocated resource blocks, transfer portions of the machine data from the unallocated resource blocks having the valid authorization marks for subsequent delivery, and inhibit a transfer of other portions of the machine data from the unallocated resource blocks not having the valid authorization marks.

2. The method of claim 1 further comprising, in the machine devices, processing stored identifiers to identify the unallocated resource blocks and transmitting the machine data and the valid authorization marks using the identified unallocated resource blocks.

3. The method of claim 1 further comprising, in the machine devices, processing a current time to identify the unallocated resource blocks and transmitting the machine data and the valid authorization marks using the identified unallocated resource blocks.

4. The method of claim 1 further comprising, in the machine devices, identifying individual ones of the unallocated resource blocks, monitoring the individual ones of the unallocated resource blocks for interference, and if the interference is below a threshold, then transmitting the machine data and the valid authorization marks using the individual ones of the unallocated resource blocks.

5. The method of claim 1 wherein transferring the portions of the machine data from the unallocated resource blocks having the valid authorization marks for subsequent delivery comprises, in the wireless base station, aggregating and transferring the portions of the machine data for delivery to a remote data server.

6. The method of claim 1 wherein transferring the portions of the machine data from the unallocated resource blocks having the valid authorization marks for subsequent delivery comprises, in the wireless base station, transferring the portions of the machine data for delivery to a remote data server without transit through a Long Term Evolution (LTE) Service Gateway (S-GW).

7. The method of claim 1 wherein transferring the portions of the machine data from the unallocated resource blocks having the valid authorization marks for subsequent delivery comprises, in the wireless base station, transferring the portions of the machine data for delivery to a remote data server without transit through a Long Term Evolution (LTE) Packet Gateway (P-GW).

8. The method of claim 1 further comprising, in the wireless base station, processing other data from the allocated resource blocks to identify invalid authorization marks in the allocated resource blocks and inhibiting a transfer of the other data.

9. The method of claim 1 wherein the OFDM resource block structure comprises a Long Term Evolution (LTE) resource block structure.

10. The method of claim 1 wherein the wireless base station comprises a Long Term Evolution (LTE) eNodeB.

11. A wireless communication system that uses an Orthogonal Frequency Division Multiplex (OFDM) resource block structure comprising:
a wireless base station configured to schedule allocated resource blocks from the OFDM resource block structure to a plurality of User Equipment devices (UEs) and hold unallocated resource blocks from the OFDM resource block structure for machine data;
a plurality of machine devices configured to process at least one of stored identifiers and current time to identify the unallocated resource blocks and to transmit the machine data and valid authorization marks using the identified unallocated resource blocks; and
the wireless base station configured to decode wireless OFDM signals based on the OFDM resource block structure to obtain user data from the UEs using the allocated resource blocks, obtain the machine data from the machine devices using the unallocated resource blocks, transfer the user data for subsequent delivery, process the machine data from the unallocated resource blocks to validate the authorization marks in the unallocated resource blocks, transfer portions of the machine data from the unallocated resource blocks having the valid authorization marks for subsequent delivery, and inhibit a transfer of other portions of the machine data from the unallocated resource blocks not having the valid authorization marks.

12. The wireless communication system of claim 11 wherein the machine devices are configured to process the stored identifiers to identify the unallocated resource blocks.

13. The wireless communication system of claim 11 wherein the machine devices are configured to process a current time to identify the unallocated resource blocks.

14. The wireless communication system of claim 11 wherein the machine devices are configured to identify individual ones of the unallocated resource blocks, monitor the individual ones of the unallocated resource blocks for interference, and if the interference is below a threshold, then transmit the machine data and the valid authorization marks using the individual ones of the unallocated resource blocks.

15. The wireless communication system of claim 11 wherein the wireless base station is configured to aggregate and transfer the portions of the machine data from the unallocated resource blocks having the valid authorization marks for delivery to a remote data server.

16. The wireless communication system of claim 11 wherein the wireless base station is configured to transfer the portions of the machine data from the unallocated resource blocks having the valid authorization marks for delivery to a remote data server without transit through a Long Term Evolution (LTE) Service Gateway (S-GW).

17. The wireless communication system of claim 11 wherein the wireless base station is configured to transfer the portions of the machine data from the unallocated resource blocks having the valid authorization marks for delivery to a remote data server without transit through a Long Term Evolution (LTE) Packet Gateway (P-GW).

18. The wireless communication system of claim 11 wherein the wireless base station is configured to process other data from the allocated resource blocks to identify invalid authorization marks in the allocated resource blocks and to inhibit a transfer of the other data.

19. The wireless communication system of claim 11 wherein the OFDM resource block structure comprises a Long Term Evolution (LTE) resource block structure.

20. The wireless communication system of claim 11 wherein the wireless base station comprises a Long Term Evolution (LTE) eNodeB.

\* \* \* \* \*